UNITED STATES PATENT OFFICE.

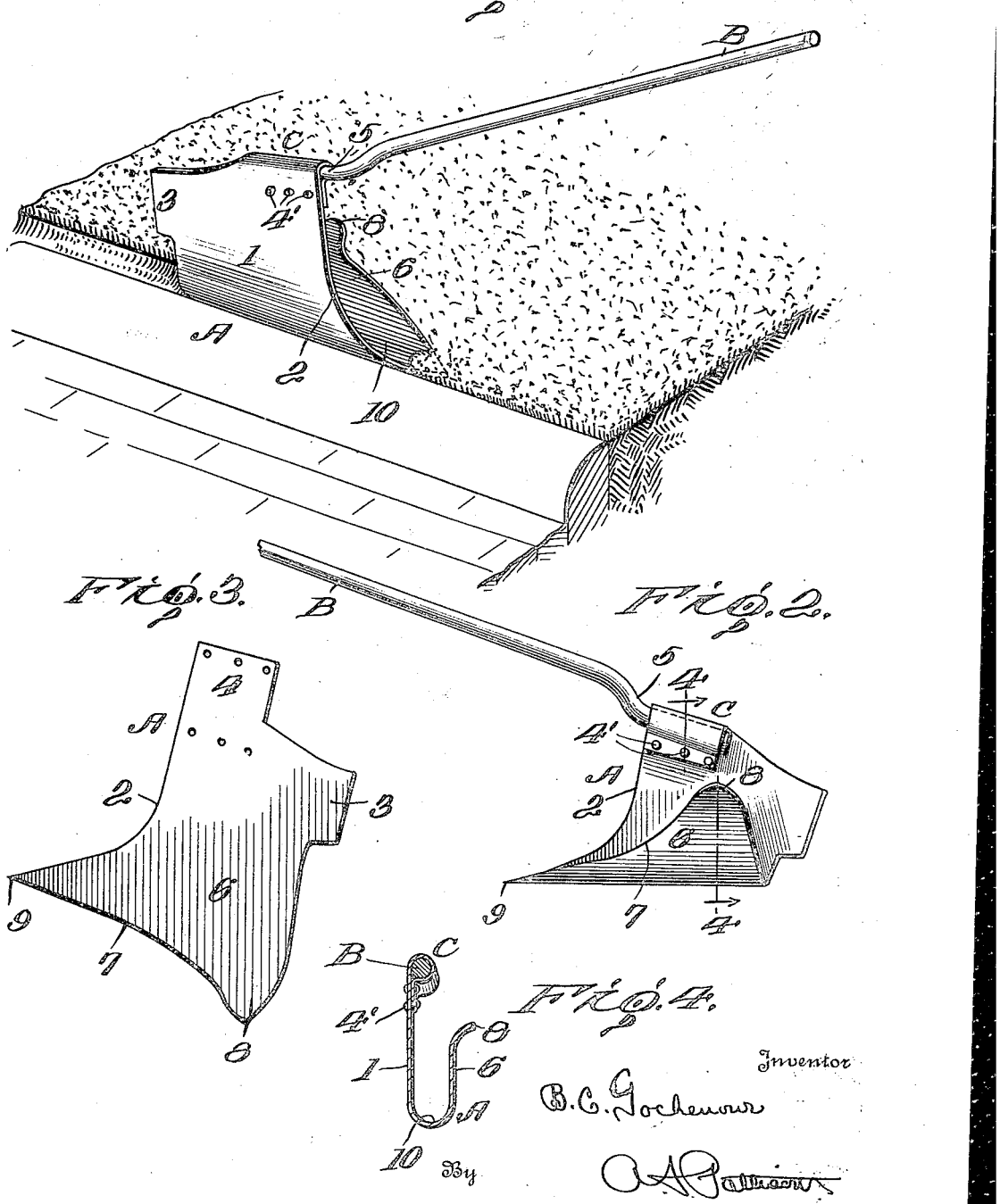

BENJAMIN C. GOCHENOUR, OF SPOKANE, WASHINGTON.

LAWN EDGER.

1,422,693.   Specification of Letters Patent.   Patented July 11, 1922.

Application filed May 31, 1921. Serial No. 473,748.

*To all whom it may concern:*

Be it known that I, BENJAMIN C. GOCHENOUR, a citizen of the United States, residing at Spokane, in the county of Spokane and State of Washington, have invented certain new and useful Improvements in Lawn Edgers, of which the following is a specification, reference being had therein to the accompanying drawing.

This invention relates to improvements in lawn edgers, of the type designated to trim the edges of walks, dig drain ditches at the edges of lawns, clear walks, or the like.

The object of my invention is to provide a lawn edger comprising a handle and a cutting member of novel construction.

Another object of my invention is to provide a lawn edger which is cheap and simple of manufacture.

A further object of my invention is to provide a lawn edger which is light and easy of operation, yet efficient in use.

Other objects and improvements will appear in the accompanying description and in the drawings, in which:

Figure 1 is a perspective view of a device constructed in accordance with my invention, showing it in use in trimming and ditching the edges of a lawn.

Fig. 2 is a view in side elevation of my improved lawn edger.

Fig. 3 illustrates the form of the blank used to make the cutting member.

Fig. 4 is a transverse vertical sectional view on the line 4—4 of Fig. 2, looking in the direction indicated by arrow.

Referring now to the drawings in which like parts are designated by similar reference numerals, A designates the blade member and B, the handle and C the handle socket.

My improved lawn edger is preferably formed from a blank, as shown in Fig. 3, cut from a sheet of steel or the like, but may, if desired, be molded at once into the proper shape.

The blade-member A is of approximately a U-shape in vertical section, as clearly shown in Fig. 4. One wall of the U, as designated by 1, has a rearwardly and upwardly curved cutting edge 2, at its front and an outwardly and rearwardly extending shovel-like portion 3 at its rear. The top edge of the wall 1 has an extending portion 4, which is bent downwardly and inwardly upon the inside of the wall to form a socket C for the handle B.

As will be clearly seen, the handle B is slightly bent as at 5, just before it enters the socket C, while the portion 4 is riveted at 4' to tightly hold the handle.

The other wall of the U-shaped blade member is designated as 6, and has a rearwardly and upwardly curved cutting edge 7 terminating at its top in an outwardly bent portion 8. The top 8 of this wall is below the top of the opposite side wall 1.

The two cutting edges 2 and 7 meet in a point 9, at the bottom of the U, and it will be seen that a trough 10 extends from the point 9 the entire length of the bottom of the blade member A.

In operation my improved lawn edger is used as shown in Fig. 1, with the wall 1, to which the handle is attached, against the walk or curbing. The wall 6 is the primary cutting member and is adequately sharpened to cut the soil. It will be readily seen that any desired depth of cut or ditch can be made with my improved implement. Attention is also called to the fact that the cutting edge 6 is to the rear of the opposite cutting edge 2 and that as the soil and dirt are cut it will fall into the trough 10 and finally pass out the rear end of the blade member A.

When grass or dirt has overlapped the walk, the shovel-portion 3 is used to loosen it before the edger is used as described above. In using the shovel portion 3, the blade member is turned over upon its side 1.

Attention is also directed to the fact that the handle extends at right angles to the cutting edges of the blade-member. By this construction I find that the implement operates to better advantage and with less exertion.

Having thus described my invention, what I claim and desire to secure by Letters Patent is:

1. A lawn edger comprising a handle and a blade member, the blade member having a narrow trough-shaped bottom with upwardly extending side walls, one of the side walls extending above the other and provided with a handle receiving socket, the front edges of the side walls sharpened and curved upwardly and rearwardly and the cutting edge of the side wall having the handle socket extending in front of the cutting edge of the other side wall, for the purpose described.

2. A lawn edger comprising a handle and a blade-member, the blade member having a trough-shaped bottom and upwardly extending side walls, the front edges of the side walls sharpened, one side wall provided at its top edge with a handle receiving socket and at its rear edge with a flat extension in the same plane as the side wall to form a shovel, for the purpose described.

3. A blank for a lawn trimming instrument, terminating at two of its corners in points, the other two corners having outwardly extending square portions at right angles to each other, and one of the square portions adapted to form a socket for a handle.

In testimony whereof I hereunto affix my signature.

BENJAMIN C. GOCHENOUR.